United States Patent
Okubo

(10) Patent No.: US 11,137,125 B2
(45) Date of Patent: Oct. 5, 2021

(54) VEHICLE LAMP

(71) Applicant: Ichikoh Industries, Ltd., Isehara (JP)

(72) Inventor: Yasuhiro Okubo, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/049,772

(22) PCT Filed: Apr. 23, 2019

(86) PCT No.: PCT/JP2019/017199
§ 371 (c)(1),
(2) Date: Oct. 22, 2020

(87) PCT Pub. No.: WO2019/208559
PCT Pub. Date: Oct. 31, 2019

(65) Prior Publication Data
US 2021/0239291 A1    Aug. 5, 2021

(30) Foreign Application Priority Data
Apr. 26, 2018 (JP) .............................. JP2018-084798

(51) Int. Cl.
*F21S 41/27* (2018.01)
*F21V 14/06* (2006.01)
*G02B 13/18* (2006.01)

(52) U.S. Cl.
CPC .............. *F21S 41/27* (2018.01); *F21V 14/06* (2013.01); *G02B 13/18* (2013.01)

(58) Field of Classification Search
CPC ... F21S 41/25–275; F21S 41/29; F21S 41/295
See application file for complete search history.

(56) References Cited

U.S. PATENT DOCUMENTS

2004/0141240 A1    7/2004   Do
2015/0086079 A1*   3/2015   Murao ...................... G06T 7/20
                                                                382/104
(Continued)

FOREIGN PATENT DOCUMENTS

CN    105445905 A   *   3/2016   ............. G02B 13/04
CN    207689738 U   *   8/2018
(Continued)

OTHER PUBLICATIONS

International Search Report dated Jul. 2, 2019 in PCT/JP2019/017199 filed on Apr. 23, 2019, 2 pages.

*Primary Examiner* — Mariceli Santiago
(74) *Attorney, Agent, or Firm* — Oblon, McClelland, Maier & Neustadt, L.L.P.

(57) ABSTRACT

A vehicle lamp includes a light source, and an aberration correction lens unit, that corrects chromatic aberration, irradiates in a frontward direction with direct light from the light source. The aberration correction lens unit includes a first lens located in a front side of the light source, and a second lens located in front of the first lens. The aberration correction lens unit performs vibration control for vibrating intersections in a front-back direction. The intersections are intersections of an optical axis, and red, green, and blue components of white light incident in parallel from the front toward the outside in the radial direction from the optical axis side of the aberration correction lens unit.

7 Claims, 4 Drawing Sheets

(56) References Cited

U.S. PATENT DOCUMENTS

2017/0242220 A1* 8/2017 Lee .................. G02B 13/06
2019/0086052 A1    3/2019 Kurosu et al.

FOREIGN PATENT DOCUMENTS

| CN | 111853699 A | * | 10/2020 | | |
|----|-------------|---|---------|---|---|
| JP | 2001-116990 A | | 4/2001 | | |
| JP | 2004-226595 A | | 8/2004 | | |
| JP | 2016-107761 A | | 6/2016 | | |
| JP | 2016219183 A | * | 12/2016 | ............ | F21S 41/176 |
| WO | WO 2017/199841 A1 | | 11/2017 | | |

* cited by examiner ns.
VEHICLE LAMP

TECHNICAL FIELD

The disclosure relates to vehicle lamps.

BACKGROUND ART

There is a conventionally known lamp unit for road surface drawing including a light source module and an optical system. The light source module includes arrays of light sources respectively corresponding to drawing patterns. The optical system emits emission light from the light sources in the forward direction of the vehicle. The light sources can be turned on or off independently from each other. Each of the drawing patterns are long in a first direction, which is the width direction of the road, and short in a second direction, which is a direction orthogonal to the width direction of the road and the emission axes of the light sources. The drawing patterns are drawn at multiple sites on a road along the second direction (refer to PTL 1).

CITATION LIST

Patent Literature

PTL 1: Japanese Unexamined Patent Publication No. 2016-107761

SUMMARY OF THE INVENTION

Problems to be Solved by the Invention

When irradiation patterns are to be projected on road surfaces to provide warnings and indicate priority to pedestrians, or to notify drivers about the presence of pedestrians, it is desired that the irradiation patterns be clear.

However, when an irradiation pattern is projected onto a road surface through a lens or the like, in some cases, the outline of the irradiation pattern blurs into a blue color due to the influence of chromatic aberration, and thus the clarity of the irradiation pattern may be reduced.

Therefore, an object of the present disclosure is to provide a vehicle lamp that suppresses the influence of chromatic aberration and enhances the clarity of an irradiation pattern.

Means for Solving the Problem

According to an aspect of the disclosure, a vehicle lamp includes a light source, and an aberration correction lens unit, that corrects chromatic aberration, irradiates in a frontward direction with direct light from the light source. The aberration correction lens unit includes a first lens located in a front side of the light source, and a second lens located in front of the first lens. The aberration correction lens unit performs vibration control for vibrating intersections in a front-back direction. The intersections are intersections of an optical axis, and red, green, and blue components of white light incident in parallel from the front toward the outside in the radial direction from the optical axis side of the aberration correction lens unit.

Effect of the Invention

The present disclosure provides a vehicle lamp that suppresses the influence of chromatic aberration and enhances the clarity of an irradiation pattern.

MODE FOR CARRYING OUT THE INVENTION

Embodiments will now be described with reference to the accompanying drawings.

Note that the same numbers or reference signs denote the same elements throughout the description of the embodiments.

In the embodiments and drawings, the terms "front" and "rear" respectively refer to a "forward traveling direction" and a "backward traveling direction", and the terms "top", "bottom", "left", and "right" refer to directions as seen from the driver of a vehicle 102, unless otherwise specified.

Note that the terms "top" and "bottom" also respectively refer to the "top" and the "bottom" in the vertical direction, and the terms "left" and "right" also respectively refer to the "left" and "right" in the horizontal direction.

Figure 1:
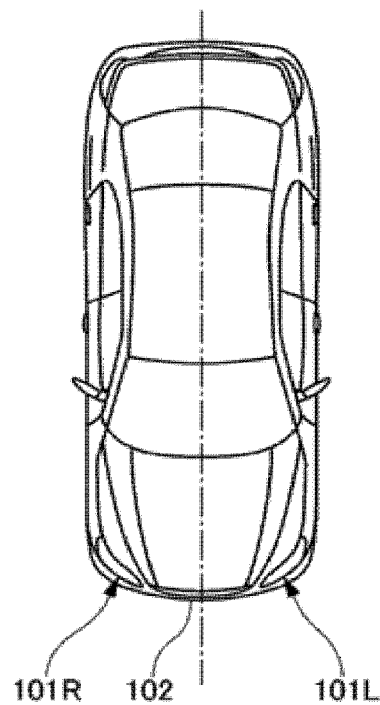
FIG. 1 is a plan view of a vehicle including vehicle lamps of an embodiment.

FIG. 1 is a plan view of the vehicle 102 including vehicle lamps of an embodiment.

As illustrated in FIG. 1, the vehicle lamps of the embodiment are vehicle headlights (101L, 101R) disposed on the front of the vehicle 102 on the left and right sides, and, hereinafter, are simply referred to as vehicle lamps.

A vehicle lamp of the present embodiment includes a housing (not illustrated) opened on the front side of the vehicle and an outer lens (not illustrated) attached to the housing so as to cover the opening. The vehicle lamp further includes a lamp unit 1 (see FIG. 2), etc., disposed in a lighting room composed of the housing and the outer lens.

Figure 2:
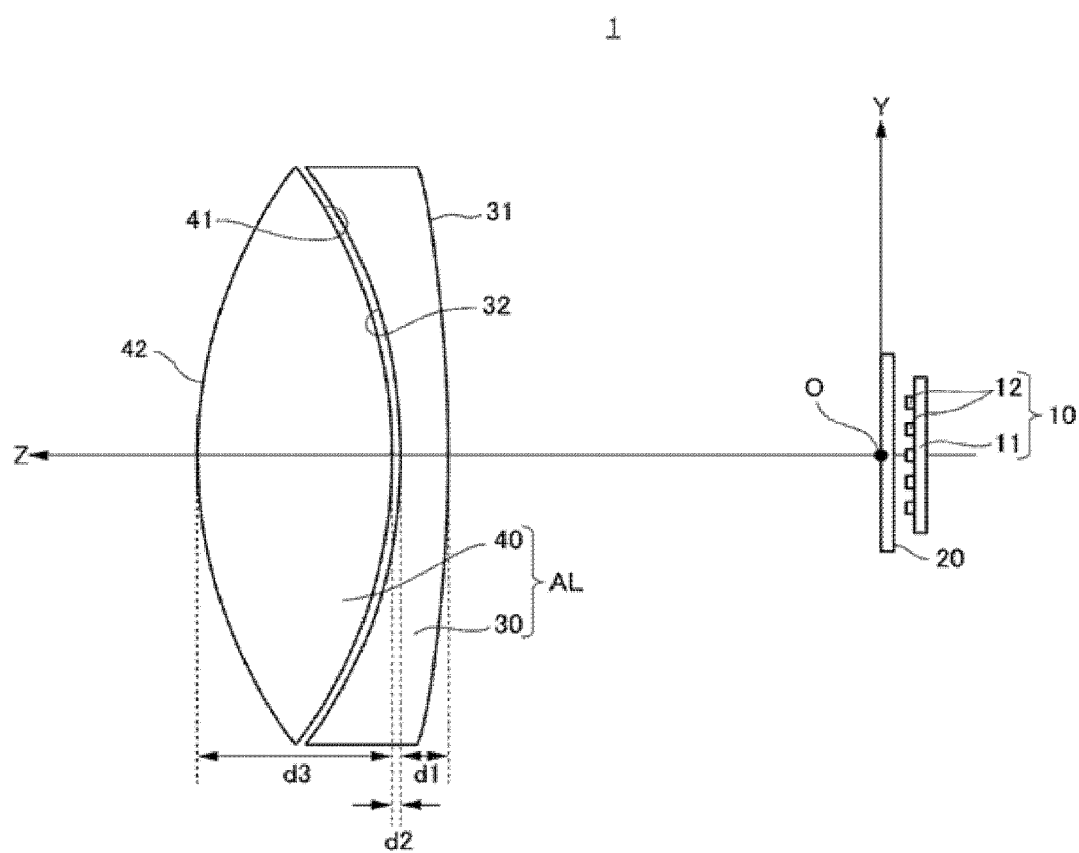
FIG. 2 is a diagram for describing a main part of a lamp unit of an embodiment.

FIG. 2 is a side view for describing a main part of the lamp unit 1 of an embodiment.

As illustrated in FIG. 2, the lamp unit 1 includes a light source 10, a shade 20, and an aberration correction lens unit AL. The light source 10 blocks a portion of the light from the light source 10 and forms an irradiation pattern with the light irradiated forward. The aberration correction lens unit AL that corrects chromatic aberration, irradiates in a frontward direction with direct light from the light source 10.

Although not illustrated in FIG. 2, the lamp unit 1 includes a heat sink having a forward-facing surface to which the light source 10 is attached. A shade holder (not illustrated) that is attached to the heat sink holds the shade 20 at a predetermined position located in front of the light source 10.

Although also not illustrated in FIG. 2, a lens holder attached to the heat sink holds a first lens 30 and a second lens 40 of the aberration correction lens unit AL at predetermined positions located in front of the shade 20.

Note that FIG. 2 illustrates only the lens portions of the first lens 30 and the second lens 40 that perform optical control. However, the first lens 30 and the second lens 40 have flanges on their outer circumferences, and the flanges are held by the lens holder.

However, the flanges are not an essential requirement because the first lens 30 and the second lens 40 may be held by the lens holder by adhering or welding, to the lens holder, the outer circumferential faces of the lens portions of the first lens 30 and the second lens 40 that perform optical control.

The light source 10 includes a substrate 11 and a plurality of (five, in this example) light emitting chips 12. The light emitting chips 12 serving as light emitting parts are disposed apart from each other on the forward-facing surface of the substrate 11 along the vertical direction (Y-axis direction).

In the present embodiment, the light source 10 is an LED light source in which the light emitting chips 12 are LED devices. Alternatively, the light source 10 may be an LD light source in which the light emitting chips 12 are laser diode (LD) devices.

In the present embodiment, the light source 10 includes multiple light emitting chips 12 disposed on one substrate 11. Alternatively, the light source 10 of the lamp unit 1 may include an array of package-type LED light sources each including one light emitting chip 12 disposed on one substrate 11.

The present embodiment describes a case in which an irradiation pattern is projected to inform the driver about the presence of a pedestrian. Therefore, the shade 20 described below has a long slit extending in the vertical direction (Y-axis direction) in order to irradiate a linear light patter from the vehicle 102 toward the lower hip area of the pedestrian and onto the road surface or the like. The light emitting chips 12 are disposed along the slit in the vertical direction (Y-axis direction).

However, when the lamp unit 1, for example, encourages pedestrians to cross the road, the irradiation pattern projected on the road surface or the like is a pattern of light extending in the left-right direction (also referred to as the vehicle width direction) of the vehicle 102. In such a case, the light emitting chips 12 are arrayed in the vehicle width direction.

Besides a simple linear light pattern, a warning mark (figures, characters, combination of figures and characters, etc.) may be projected onto the road surface or the like and the irradiation range of the light from the light source 10 may be required to be wide in the vehicle width direction and the vertical direction (Y-axis direction). In such a case, the light emitting chips 12 may be arranged into a matrix of multiple light emitting chips 12 in the vehicle width direction and the vertical direction (Y-axis direction).

As described above, the shade 20 is a member for forming an irradiation pattern to be projected on a road surface or the like. The shape of an opening in the shade 20 through which light is transmitted is determined in accordance with the irradiation pattern to be irradiated.

However, the shade 20 is not an indispensable member. For example, if the irradiation pattern may linearly extend with a relatively large width, it is possible to form the irradiation pattern by suitably overlapping rectangular images of light irradiated from the light emitting chips 12 having rectangular light emitting faces.

However, even when a linear irradiation pattern is to be projected onto a road surface or the like, the shade 20 is preferred because the shade 20 can readily form a light pattern by making the boundary of the irradiation pattern clear.

The aberration correction lens unit AL includes a first lens 30 and a second lens 40. The first lens 30 is located in a front side of the light source 10. The second lens 40 is located in front of the first lens 30.

For example, both the first lens 30 and the second lens 40 may be made of resin.

In specific, the first lens 30 is made of a resin having a high refractive index and high dispersion (for example, polycarbonate resin or the like), and the second lens 40 is made of a resin having a low refractive index and low dispersion (for example, acrylic resin or the like), so that the Abbe numbers of the first lens 30 and the second lens 40 are different (in this example, the Abbe number of the second lens 40 is larger than that of the first lens 30). Also, as described below, the aberration correction lens unit AL is controlled to vary the chromatic aberration in the front-back direction along a direction radially outward from the center (the lens optical axis Z of the aberration correction lens unit AL), to suppress chromatic aberration.

The more detailed configuration of the aberration correction lens unit AL will be described below. The specific dimensions described below are mere examples because the dimensions are adjusted in accordance with the outer diameters, etc., of the first lens 30 and the second lens 40.

The first lens 30 has an incident face 31 on which light from the light source 10 is incident, and an emission face 32 that irradiates the incident light toward the second lens 40. The first lens 30 is a concave meniscus lens in which the incident face 31 curves to protrude outward (backward) and the emission face 32 curves to depress inward (backward).

For example, the incident face 31 is a convex curved surface having a radius of curvature of approximately 103 mm in the paraxial region, and the emission face 32 is a concave curved surface having a radius of curvature of approximately 28 mm in the paraxial region.

The thickness d1 of the first lens 30 located along the lens optical axis Z is approximately 11 mm.

The second lens 40 has an incident face 41 on which the light from the first lens 30 is incident, and an emission face 42 that irradiates the incident light forward. The second lens 40 is a biconvex lens in which the incident face 41 curves to protrude outward (backward) and the emission face 42 curves to protrude outward (backward).

For example, the incident face 41 is a convex curved surface having a radius of curvature of approximately 29 mm in the paraxial region; the emission face 42 is a convex curved surface having a radius of curvature of approximately 40 mm in the paraxial region; and the thickness d3 of the second lens 40 located along the lens optical axis Z is approximately 19 mm.

The second lens 40 is disposed in front of the first lens 30 such that the separation distance d2 between the first lens 30 and the second lens 40 is approximately 0.5 mm.

In the present embodiment, the aberration correction lens unit AL is disposed such that the rear focal point O substantially coincides with the location of the front face of the shade 20 when viewed from the direction of the lens optical axis Z. The rear focal point O is that of the entire aberration correction lens unit AL including the first lens 30 and the second lens 40.

Since the rear focal point O substantially coincides with the light irradiated from the shade 20, blurriness of the irradiation pattern can be suppressed.

Note that the rear focal point O substantially coincides with a second reference focal point GO, which is described below. This is because the light source 10 is disposed such that the light emitting parts (the light emitting chips 12) are located behind the second reference focal point GO when viewed from the front-back direction, and the shade 20 is disposed such that the forward-facing surface of the shade 20 is located to substantially coincide with the second reference focal point GO when viewed from the front-back direction.

Figure 3:
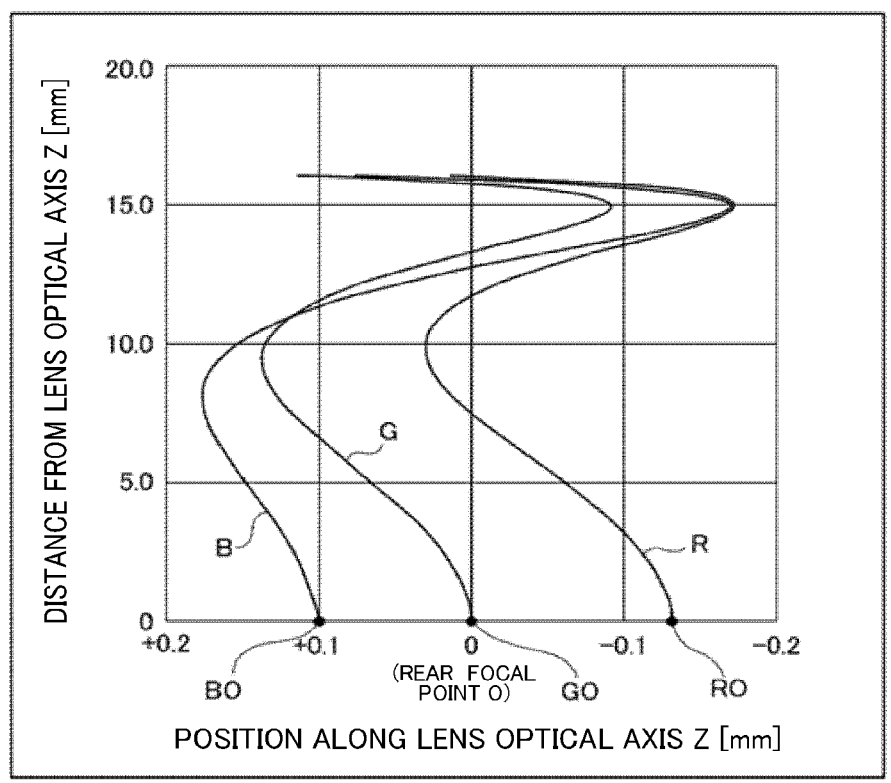
FIG. 3 is a diagram for explaining the control for varying the amount of chromatic aberration of an aberration correction lens unit of an embodiment in the front-back direction.

FIG. 3 is a diagram for explaining the control for varying the amount of chromatic aberration of the aberration correction lens unit AL in the front-back direction.

FIG. 3 illustrates the shift of intersections the lens optical axis Z (hereinafter, may also simply be referred to as optical axis Z), and a red component R, a green component G, and a blue component B of white light. The white light is incident on the emission face 42 of the second lens 40 in parallel to the lens optical axis Z as the white light is moved racially outward from the lens optical axis Z of the aberration correction lens unit AL.

Accordingly, in FIG. 3, the horizontal axis represents a location on the lens optical axis Z. The origin 0 of this horizontal axis coincides with the rear focal point O. The positive side of the origin 0 of the horizontal axis is located on the front side of the rear focal point O.

The negative side of the origin 0 of the horizontal axis is located on the rear side of the rear focal point O.

The vertical axis represents the distance from the lens optical axis Z in the racially outward direction of the aberration correction lens unit AL, where the location of the lens optical axis Z is at the origin 0.

Note that the horizontal and vertical axes are represented in millimeters [mm].

The location RO of the red component R on the lens optical axis Z corresponding to 0 on the vertical axis is a first reference focal point (hereinafter, also referred to as the first reference focal point RO) that is a reference rear focal point or a paraxial focal point of the entire aberration correction lens unit AL for the red component R.

Similarly, the location GO of the green component G on the lens optical axis Z corresponding to 0 on the vertical axis is a second reference focal point (hereinafter, also referred to as the second reference focal point GO) that is a reference rear focal point or a paraxial focal point of the entire aberration correction lens unit AL for the green component G. The position BO of the blue component B on the lens optical axis Z corresponding to 0 on the vertical axis is a third reference focal point (hereinafter, also referred to as the third reference focal point BO) that is a reference rear focal point or a paraxial focal point of the entire aberration correction lens unit AL for the blue component B.

As illustrated in FIG. 3, the aberration correction lens unit AL performs vibration control for vibrating, in the front-back direction, an intersection of the optical axis Z and each of the red component R, the green component G, and the blue component B of white light incident in parallel from the front toward the outside in the radial direction from the optical axis Z side of the aberration correction lens unit AL. In synchronization with this movement, the amount of chromatic aberration also varies in the front-back direction, and thereby the chromatic aberration is suppressed.

Specifically, the aberration correction lens unit AL has a second reference focal point GO that substantially coincides with the rear focal point O, a first reference focal point RO located behind the second reference focal point GO, and a third reference focal point BO located in front of the second reference focal point GO.

The aberration correction lens unit AL performs vibration control for vibrating, in the front-back direction, the intersections of the optical axis Z, and the red component R, the green component G, and the blue component B of white light as the white light is moved radially outward from the optical axis Z of the aberration correction lens unit AL, where the first reference focal point RO, the second reference focal point GO, and the third reference focal point BO, which are different positions on the optical axis Z, serve as points of origin.

Specifically, the aberration correction lens unit AL performs vibration control including control for vibrating the intersection of the optical axis Z and the red component R in at least the forward, backward, and forward directions for light passing from the optical axis Z side to the outside in the radial direction of the aberration correction lens unit AL, where the first reference focal point RO is the point of origin; control for vibrating the intersection of the optical axis Z and the green component G in at least the forward, backward, and forward directions for light passing from the optical axis Z side to the outside in the radial direction of the aberration correction lens unit AL, where the second reference focal point GO is the point of origin; and control for vibrating the intersection of the optical axis Z and the blue component B in at least the forward, backward, and forward directions for light passing from the optical axis Z side to the outside in the radial direction of the aberration correction lens unit AL, where the third reference focal point BO is the point of origin. In this way, chromatic aberration is suppressed.

When the chromatic aberration is suppressed in this way, the peripheral outline of the irradiation pattern irradiated forward through the aberration correction lens unit AL is suppressed from being blurred in blue. Consequently, a reduction in the clarity of the irradiation pattern can be suppressed.

Although specific embodiments have been described above, the present invention is not limited to the above embodiments.

For example, in the embodiment described above, the light from the light source 10 is directly irradiated to the shade 20. In such a case, the light emitting chips 12 are disposed close to the shade 20 in order to reduce the proportion of the light that spreads and cannot pass through the slit of the shade 20.

If this happens, the temperature of the shade 20 rises. For this reason, it is necessary to enhance the heat resistance of the shade 20 so that the shade 20 is not distorted by heat.

Figure 4:
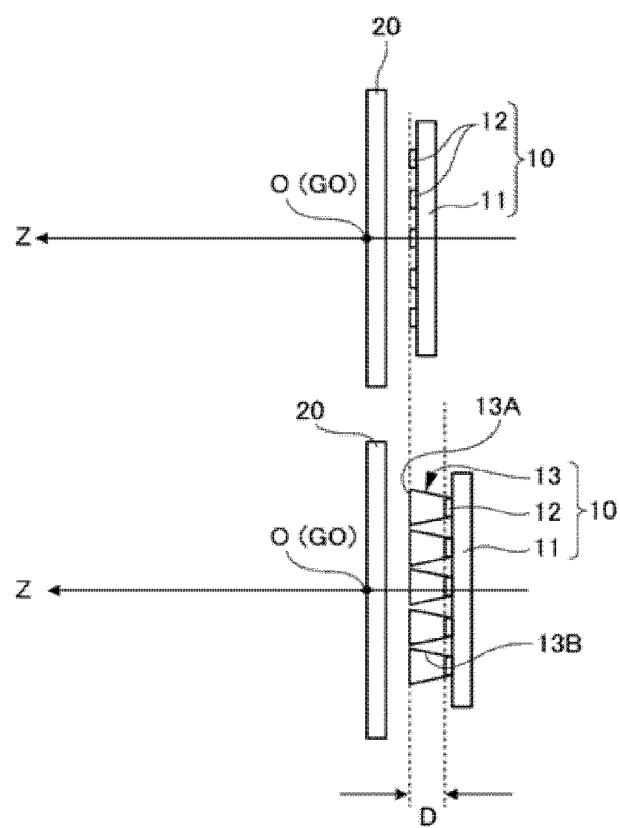
FIG. 4 is a diagram illustrating a light source of a modified example of an embodiment.

Accordingly, as in FIG. 4 illustrating a modified example of the light source 10, the light source 10 may include multiple reflectors 13 corresponding to the respective light emitting parts (the light emitting chips 12). The reflectors 13 suppress the spreading of the light irradiated to the shade 20.

Note that in FIG. 4, the aberration correction lens unit AL is not illustrated.

In this way, light irradiation ports 13A of the reflectors 13 can be regarded as pseudo light emitting parts. Thus, the light source 10 may be located such that the light irradiation ports 13A of the reflectors 13 are aligned with the forward-facing surfaces of the light emitting parts (the light emitting chips 12) of the light source 10 illustrated in the top portion of FIG. 4, which does not include the reflectors 13.

As a result, in the case where the light source 10 includes the reflectors 13, the distance between the shade 20 and the light emitting parts (the light emitting chips 12) can be increased by a distance D, and thereby suppress an increase in the temperature of the shade 20.

Even in such a case, the irradiation pattern irradiated from the shade 20 is made clear by locating the light source 10 such that the reflectors 13 are disposed behind the second reference focal point GO when viewed from the front-back direction, because the rear focal point O (the second reference focal point GO) of the aberration correction lens unit AL should be located at the location of the front-facing surface of the shade 20 along the front-back direction (the optical axis Z direction).

Note that, as in the embodiment described above, it is preferred that, when the light beams from the light emitting parts (the light emitting chips 12) are overlapped, the image of the light irradiated to the shade 20 be a rectangular shape so that the linear irradiation pattern has no unevenness in brightness.

For this reason, if the reflectors 13 are to be used to form a linear irradiation pattern, it is preferred that the reflectors 13 each have a reflection surface 13B expanding in a rectangular shape (spreading in the shape of a quadrangular pyramid) from the light emitting parts (the light emitting chips 12) to the shade 20.

By using the reflectors 13, not only the distance between each light emitting part (each light emitting chip 12) and the shade 20 can be increased, but also the state of the overlap of the light beams from the light emitting parts (the light emitting chips 12) can be controlled. From this view point, also, it is preferred that the light source 10 include the reflectors 13 because unevenness in brightness can be readily suppressed.

In the above-described embodiments, the aberration correction lens unit AL performs vibration control for vibrating the intersections of the optical axis Z, and the red component R, the green component G, and the blue component B of white light forward, backward, and forward in the front-back direction as the white light is moved radially outward from the optical axis Z. However, the frequency may be higher (for example, forward, backward, forward, backward, and forward vibration). Depending on the design, the vibration may be backward, forward, and backward.

In the embodiment described above, as illustrated in FIG. 3, the vibration of the intersections in the front-back direction does not exceed the range of 0.2 mm (±0.2 mm) with respect to the rear focal point O. Alternatively, the intersections may be controlled to vibrate in the front-back direction within a larger range.

As described above, the present invention is not limited to the embodiments, and modifications and improvements are also included in the technical scope of the invention. This will be apparent to those skilled in the art from the description of the claims.

DESCRIPTION OF REFERENCE NUMERALS

1 Lamp unit
10 Light source
11 Substrate
12 Light emitting chips (light emitting parts)
13 Reflectors
13A Light irradiation ports
13B Reflection surface
20 Shade
30 First lens
31 Incident face
32 Emission face
40 Second lens
41 Incident face
42 Emission face
AL Aberration correction lens unit
R Red component
RO First reference focal point
G Green component
GO Second reference focal point
B Blue component
BO Third reference focal point
Z Lens optical axis
101L, 101R Vehicle headlights
102 Vehicle

The invention claimed is:

1. A vehicle lamp comprising:
a light source; and
an aberration correction lens unit, that corrects chromatic aberration, irradiates in a frontward direction with direct light from the light source, wherein,
the aberration correction lens unit comprises:
a first lens located in a front side of the light source; and
a second lens located in front of the first lens, and
the aberration correction lens unit performs vibration control for vibrating intersections in a front-back direction, the intersections being intersections of an optical axis, and red, green, and blue components of white light incident in parallel from the front toward the outside in the radial direction from the optical axis side of the aberration correction lens unit.

2. The vehicle lamp according to claim 1, wherein,
the aberration correction lens unit has:
a first reference focal point that is located on the optical axis, the first reference focal point being a reference rear focal point the aberration correction lens unit as a whole for the red component;
a second reference focal point is located on the optical axis, different from the first reference focal point, the second reference focal point being a reference rear focal point of the aberration correction lens unit as a whole for the green component; and
a third reference focal point is located on the optical axis, different from the first reference focal point and the second reference focal point, the third reference focal point being a reference rear focal point of the aberration correction lens unit as a whole for the blue component,
the vibration control includes:
control for vibrating an intersection of the optical axis and the red component in at least forward, backward, forward directions for light passing from the optical axis side to the outside in the radial direction of the aberration correction lens unit, where the first reference focal point is a point of origin;
control for vibrating an intersection of the optical axis and the green component in at least forward, backward, forward directions for light passing from the optical axis side to the outside in the radial direction of the aberration correction lens unit, where the second reference focal point is a point of origin; and
control for vibrating an intersection of the optical axis and the blue component in at least forward, backward, forward directions for light passing from the optical axis side to the outside in the radial direction of the aberration correction lens unit, where the third reference focal point is a point of origin, and
the light source is located on the optical axis behind the second reference focal point.

3. The vehicle lamp according to claim 2, wherein,
the first reference focal point is located behind the second reference focal point, and
the third reference focal point is located in front of the second reference focal point.

4. The vehicle lamp according to claim 2, wherein,
the light source includes a plurality of light emitting parts, and the light source is disposed such that the light emitting parts are located behind the second reference focal point when viewed from a front-back direction.

5. The vehicle lamp according to claim 4, wherein, the light source includes a plurality of reflectors corresponding to the respective plurality of light emitting parts, and the light source is disposed such that the reflectors are located behind the second reference focal point when viewed from the front-back direction.

6. The vehicle lamp according to claim 2, further comprising:

a shade that blocks a portion of the light from the light source and forms an irradiation pattern of the light irradiated forward, wherein the shade is disposed such that a forward-facing surface of the shade is substantially located at the second reference focal point when viewed from the front-back direction.

7. The vehicle lamp according to claim 2, wherein the second reference focal point substantially coincides with a rear focal point of the aberration correction lens unit as a whole for the white light.

\* \* \* \* \*